United States Patent Office 3,336,242
Patented Aug. 15, 1967

3,336,242
POLYURETHANES PRODUCED FROM ETHYLENE OXIDE CAPPED POLYHYDRIC ALCOHOL-PROPYLENE OXIDE ADDUCTS
Horace N. Hampson, Sale, and Edward R. A. Forshaw, Sale Moor, England, assignors to Shell Oil Company, New York, N.Y., a corporation of Delaware
No Drawing. Filed Oct. 2, 1961, Ser. No. 142,011
Claims priority, application Great Britain, Oct. 3, 1960, 33,834/60
4 Claims. (Cl. 260—2.5)

This invention relates to the preparation of resilient or elastomeric cellular materials. More particularly, the invention relates to the production of polyurethane resins or plastics.

Specifically, the invention provides a novel process for preparing polyurethane resins which comprises reacting an organic polyfunctional isocyanate or isothiocyanate with a polyol formed by reacting (1) a condensation product of an alkylene oxide having at least three carbon atoms and an organic compound having a plurality of reactive hydrogen atoms with (2) from 1% to 10% by weight of the alkylene oxide of ethylene oxide.

Polyurethanes have been prepared in several forms. One form of the polyurethane is a polymeric material, often referred to for convenience as polyurethane "prepolymer," which is obtained by reacting an organic polyfunctional isocyanate or a polyfunctional isothiocyanate with an organic compound containing in the molecule a plurality of active, hydrogen atoms (as determined by the Zerewitinoff method, J.A.C.S., vol. 49, page 3181, 1929), such as, for example, an organic polyhydroxy compound. While such prepolymers are in themselves useful polymeric materials, for example, prepolymers can be molded or cast into sheets or converted into synthetic rubbers, such prepolymers are at present particularly useful as intermediates for the production of another form of polyurethane, namely, a cross-linked polyurethane which for convenience of description is referred to herein as a polyurethane "plastic." Such polyurethane plastics can be prepared from prepolymers either (a) by reacting a prepolymer which contains free isocyanate or isothiocyanate radicals with a compound containing in the molecule a plurality of active hydrogen atoms or (b) by reacting with a polyisocyanate or a polyisothiocyanate, a prepolymer which contains active hydrogen atoms but which substantially does not contain free isocyanate or isothiocyanate radicals. In the second-mentioned case the prepolymer will usually contain active hydrogen atoms in the form of hydroxyl groups. The polyisocyanates and polyisothiocyanates referred to herein are organic compounds of the general formula $R(NCX)_{n+1}$, wherein R represents an organic radical, X represents an oxygen atom or a sulfur atom and $n$ is a positive integer.

It is also possible to prepare polyurethane plastics directly by reacting an organic polyisocyanate or polyisothiocyanate with an organic compound or compounds containing in the molecule a plurality of active hydrogen atoms under such conditions that the desired cross-linked polyurethane plastic is formed. This direct method of preparation is often referred to in the art as the single-stage or "one-shot" method, and from the manufacturing point of view it is often to be preferred to the two-stage method involving, as the first stage, the preparation of a prepolymer.

The polyurethane plastics are particularly useful when in the form of the cellular materials commonly known as polyurethane foams which, depending upon their physical properties, find particular application as insulating and shock-absorbing materials which may be used for many purposes in industry. Depending on the nature of the starting materials and the conditions under which the polyurethane foams are prepared it is possible to produce rigid foams suitable, for example, for heat insulation and resilient foams of various degrees of resilience suitable, for example, for shock absorption and for seat coverings, carpet underlays and many other purposes including, in the case of open-cell resilient foams, sound insulation. In general, polyurethane foams can be prepared by "blowing" the reaction mixture during the conversion of a prepolymer into a polyurethane plastic, or, in the case of the one-shot method, by blowing the reaction mixture in which the polyurethane plastic is produced directly from starting materials comprising a polyisocyanate or polyisothiocyanate and an organic compound having in the molecule a plurality of active hydrogen atoms. In either case blowing can be accomplished for example by such techniques as generating a gaseous blowing agent, e.g., carbon dioxide in situ in the reaction mixture or by supplying a gaseous blowing agent such as air thereto. In the case of the one-shot method, the reactants are usually mixed in a so-called mixing head fitted with a stirrer capable of rotation at speeds of the order of 2000 to 5000 r.p.m. In addition to promoting rapid and thorough mixing of the reactants the action of the stirrer also aids foam formation.

Theoretically at least the reaction which takes place during the formulation of polyurethane resins by reacting an organic polyfunctional isocyanate or polyfunctional isothiocyanate with an organic compound containing a plurality of reactive hydrogen atoms is applicable to a large number of such organic compounds. On the other hand, however, the properties of the resulting polyurethane resins, and plastics prepared therefrom, depend to a large extent on the particular kind of organic compound used. It has been found that the organic compounds used have a marked effect on the properties of the polyurethane resins produced. Some organic compounds are better than others from the point of view of producing resins having more desirable physical properties, for example, color, thermal stability, moldability and, in the case of elastomeric products, resilience and deformation recovery. A particularly important application of polyurethanes is in the production of resilient cellular polyurethane plastics, and in this field of application a high degree of strength and an ability to recover quickly from deformation while at the same time having good resistance to fatigue, are desirable properties.

Investigation has shown that suitable starting materials for the production of polyurethanes are polyhydroxy compounds having a molecular weight of, for example, 200 to 2000 depending inter alia on the kind of polyurethane required. Such polyhydroxy compounds contain in the molecule a plurality of active hydrogen atoms in the form of hydroxy groups. Polyhydroxy compounds of various molecular weights can be prepared in a manner well known in the art simply by condensing an alkylene oxide with what may be termed a nucleating agent consisting of an organic compound containing in the molecule a plurality of active hydrogen atoms, the resulting condensation products (usually referred to as polyethers) having an average molecular structure which comprises the nucleating agent having a plurality of oxyalkylene branchings in place of these active hydrogen atoms. Each of these oxyalkylene branchings carries an hydroxyl group at or near its outer end. The alkylene oxides usually employed in polyether manufacture are ethylene oxide and 1,2-propylene oxide. There is a need in the polyurethane art for a polyurethane foam which is both hard and flexible and it has been shown that in order to achieve such a combination of physical properties in a polyurethane foam, it is necessary to prepare the polyurethane foam from a polyhydroxy compound of higher molecular weight than hitherto employed, e.g., a molecular weight of the order of 3000 to 6000. Therefore, it has been found, surprisingly, that ethylene oxide condensation products of this kind are not suitable polyhydroxy compounds for use in polyurethane manufacture. Although such polyhydroxy compounds which are prepared by condensing ethylene oxide with a nucleating agent and which contain a plurality of oxyethylene branchings are usually particularly reactive to polyisocyanates, it has been found that this, in itself, can be a disadvantage from the point of view of controlling the reaction, as for example, the reaction mixture becomes less tolerant to variations in catalyst concentration. Moreover, it has been found that, in the case of polyurethane foams, the use of such ethylene oxide condensates in the one-shot method unexpectedly gives rise to foams of closed-cell structure which is unsatisfactory for many of the applications for which polyurethane foams are required. This difficulty of closed cell formation cannot be overcome simply by using, for example, a high molecular weight 1,2-propylene oxide condensate, since such condensates, which contain mainly secondary hydroxyl groups, are insufficiently reactive to polyisocyanate to enable them to be used satisfactorily in the manufacture of polyurethane foams.

It has also been found, in accordance with the present invention, that sufficiently reactive polyhydroxy starting materials of molecular weight as high as 5000 to 6000 and above which can be used for making satisfactory polyurethane foams of the required cellular form by the one-shot method can be prepared by reacting with ethylene oxide a polyhydroxy compound which is itself a condensation product formed by condensing a nucleating agent with an alkylene oxide other than ethylene oxide, provided the amount of ethylene oxide which is reacted with said condensation product is less than 10% by weight of the alkylene oxide used in forming said condensation product. For convenience of reference the polyhydroxy compounds which are the starting materials for the preparation of polyurethanes in accordance with the present invention will be referred to hereinafter simply as polyols.

It is therefore an object of the present invention to provide an improved process for preparing polyurethane resins and foams. It is another object of the invention to provide a process for preparing polyurethane resins which have a high degree of strength, good deformation recovery and good resistance to fatigue. It is another object to provide a process for preparing polyurethane foamed products wherein the cells are open. It is another object to provide polyurethane resin and foam having improved properties. It is still another object to provide polyurethane foams having improved cell structure. These and other objects of the invention will be apparent from the following detailed description thereof.

It has now been discovered that these and other objects may be accomplished by the process which comprises reacting an organic polyfunctional isocyanate or isothiocyanate with a polyol formed by reacting (1) a condensation product of an alkylene oxide having at least three carbon atoms and an organic compound having a plurality of reactive hydrogen atoms with (2) from 1% to 10% by weight of the alkylene oxide of ethylene oxide.

It has now also been discovered that polyols which are particularly useful in polyurethane manufacture may be prepared by reacting an alkylene oxide with an organic compound having a plurality of active hydrogen atoms and then reacting this condensation product with less than 10% by weight of ethylene oxide. Such a reaction product is much more reactive than the polyols usually employed in polyurethane manufacture. This high reactivity makes these polyols particularly suitable for use in the one-shot technique.

If a polyol is prepared by reacting an organic compound having a plurality of active hydrogen atoms with more than 10% by weight of ethylene oxide, it is very active, but when used in polyurethane manufacture gives inferior products, in particular, foams with closed cells. Such closed cell foams are unsatisfactory for many applications.

Accordingly, one embodiment of the present invention is a process for the preparation of a polyurethane resin which comprises reacting under substantially anhydrous conditions an organic polyfunctional isocyanate or polyfunctional isothiocyanate of the general formula $$R(NCX)_{n+1}$$

wherein R represents a polyvalent organic radical, X represents an oxygen or sulfur atom and $n$ is any integer, with a polyol formed by reacting (1) a condensation product of an alkylene oxide having at least three carbon atoms and an organic compound having a plurality of reactive hydrogen atoms in the molecule with (2) from 1% to 10% and preferably from 3% to 8% by weight of the alkylene oxide of ethylene oxide. The present invention also includes the resulting polyurethane resins and foams.

For the purpose of the present invention, the term alkylene oxide is defined herein as meaning an organic compound containing a vic-epoxy group capable of reacting with the hydrogen atoms of the organic compound and having a plurality of reactive hydrogen atoms. By vic-epoxy group it is meant that the oxygen is attached to adjacent carbon atoms. Examples of these alkylene oxides are propylene oxide or styrene oxide, either substituted or unsubstituted, such substituents, if present, being preferably aliphatic hydrocarbon groups, such as methyl, ethyl, propyl, butyl, and the like. Particularly preferred is 1,2-propylene oxide or a butylene oxide.

The other constituent is an organic compound containing a plurality of active hydrogen atoms. In general, any such organic compounds are suitable which contain a plurality of active hydrogen atoms as determined by the Zerewitinoff method. The hydrogen atoms of said organic compounds may be activated by an oxygen atom as in a hydroxyl group, a phenol group, or a carboxylic acid group; a basic nitrogen atom as in an amine group, a hydrozine group, an imine group, an amide group, a guanidine group, a sulfonamide group, an urea group, or a thiourea group; or a sulfur atom as in a mercaptan, a thiophenol or a thiocarboxylic acid. Examples of such compounds are glycerol, ethylene glycol, butanediol, oxalic acid, triethanolamine, aniline, resorcinol, diethyl malonate, pentaerythritol, sucrose, ethylene diamine and acetamide. Particularly preferred are the aliphatic polyhydroxy compounds having from 2 to 15 carbon atoms.

Suitable condensation products can be prepared, for example, by condensing butene diol or glycerol under known conditions with 1,2-propylene oxide, to give high molecular weight condensation products.

Preferably such condensation products are prepared using a basic catalyst such as, for example, an alkali metal, an alkali metal hydride or an alkali metal hydroxide; in addition, catalysts described in the specifications of copending U.S. applications Nos. 841,007, filed September 21, 1959; 41,501, filed July 8, 1960; and 56,689, filed September 19, 1960 all abandoned, may be used. In some cases it may be advantageous to prepare the condensation product from more than one such alkylene oxide, e.g., propylene oxide, a butylene oxide or styrene oxide reacted either singly or in admixture, resulting in block copolymers or random copolymers, respectively.

The polyol product is prepared by condensing an organic compound having a plurality of active hydrogen atoms as hereinbefore described with an alkylene oxide, which product may be represented by the general formula: $Y[(RO)_nH]_x$ wherein Y is the residue of the organic compound containing therein $x$ active hydrogen atoms, $x$ is an integer greater than 1, $n$ is the number of moles of alkylene oxide and R is the residue of the alkylene oxide having at least three carbon atoms.

Thus, for example, an organic compound having a plurality of active hydrogen atoms such as glycerine is placed in a reactor together with, if desired, a catalyst such as anhydrous sodium or potassium hydroxide. The alkylene oxide, such as, for example, propylene oxide, is then introduced into the reactor under pressure and the reactor products heated to from 50° C. to 200° C. with from 80° C. to 150° C. being preferred. The amount of alkylene oxide reacted with the organic compound is that quantity which produces a product having a molecular weight of from 500 to 8000. In other words, the values of $x$ and $n$ in the above formula are such that the molecular weight of the compound is between 500 and 8000 as determined by hydroxyl number. In general, the reaction may be conducted at atmospheric pressure or at pressures up to, say 100 p.s.i. The reaction is usually performed under an inert atmosphere such as nitrogen and the caustic catalyst may be neutralized with an acid such as sulfuric acid and the product subsequently filtered.

The preferred type of condensation product is one derived from glycerol, hexanetriol, 1,2,6-trimethylolpropane, pentaerythritol, triisopropanolamine or butene diol and propylene oxide and which has a molecular weight as determined by the hydroxyl number from about 500 to 8000 and preferably from about 2500 to 5500.

The condensation product is then reacted with from 1 to 10 and preferably from 3 to 8 percent by weight of the alkylene oxide of ethylene oxide to give the polyol used in the process according to the present invention. Although the unreacted alkylene oxide is generally removed before the ethylene oxide is introduced, this is not essential.

In general, the same catalyst and reaction conditions are employed in "tipping" the condensation product prepared above with ethylene oxide as were used in reacting the organic compound with the alkaline oxide to prepare the condensation product. The reaction product which results from such "tipping" with ethylene oxide may be represented by the general formula:

$$Y[(RO)_n(C_2H_4O)_mH]_x$$

wherein Y is the residue of the organic compound containing therein $x$ active hydrogen atoms, $x$ is an integer greater than 1, $n$ is the number of moles of alkylene oxide, $m$ is the number of moles of ethylene oxide, and R is the residue of the alkylene oxide having at least three carbon atoms. Particularly preferred are those compounds described above wherein Y is a polyvalent hydrocarbon having from 2 to 15 carbon atoms.

The reactant $R(NCX)_{m+1}$ may be an aliphatic, cycloaliphatic or aromatic compound or a derivative thereof provided any such derivative contains no substituent which interferes with the reaction. Advantageously, a difunctional organic isocyanate is used. Examples of isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanate, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene-1,3-diisocyanate, 4,4'-diphenylenemethane diisocyanate, 4,4'-diphenylene-propane diisocyanate, xylylene-1,4-diisothiocyanate or durene diisocyanate. In fact, any polyisocyanate or polyisothiocyanate of the general formula $R(NCX)_{m+1}$, in which $n$ is any integer, X is oxygen or sulfur and R is a polyvalent organic radical may be employed, though aromatic diisocyanates, for example a toluene diisocyanate or isomeric mixtures thereof are preferred.

In the production of polyurethane resins in accordance with the present invention, the reactants may be mixed together in the required proportions and the reaction allowed to proceed either to a desired viscosity of the reaction mixture or to a desired isocyanate content thereof. The reaction leading to the formation of the polyurethane resins in accordance with the present invention proceeds smoothly and is readily controllable.

When preparing polyurethane resins (prepolymers) the polyol may be reacted with a diisocyanate preferably at an elevated temperature, for example, 80 to 90° C. The reaction must be carried out under substantially anhydrous conditions, that is, water must be excluded from the reaction mixture to such an extent that the reaction proceeds essentially between the hydroxyl groups and the isocyanato (or isothiocyanato) groups. In general, the water content of the reaction mixture may be about 0.1% by weight of the reaction mixture.

The reaction is conveniently carried out in an atmosphere of dry inert gas, e.g., nitrogen or carbon dioxide, and, if desired, under reduced pressure.

When a molecular excess of isocyanate over the polyol is used, a resin having terminal isocyanato groups is formed. The relative amount of isocyanate used is a major factor which determines the chain length of the prepolymer. Thus, when the amount of isocyanate is only slightly more than one mole per mole of the polyol, there will be a greater chain length in the prepolymer. When the amount of isocyanate is greater than three moles per mole of the polyol the chain length will be shorter. The physical properties of the prepolymer and the polyurethane plastics or foams prepared therefrom are determined, inter alia, by the ratio of the reactants, by their molecular weights and their structures, and it may be found desirable to vary the amount of isocyanate used according to the molecular weight of the polyol.

The amount of isocyanate actually used by vary according to whether the resin is to be pressed in a heated mold to give a rubber-like product or cast into sheet form. A lower concentration of isocyanate may be used when a resin suitable for molding is to be produced, while for casting a higher concentration of the isocyanate may be used.

It will be understood that the production of polyurethane resins from the higher average molecular weight polyols is usually advantageous economically, since the amount of isocyanate, which is normally the more expensive reactant, needed to produce a resin of a given molecular weight, is then less than would be needed to produce the same molecular weight polyurethane resin from a relatively low molecular weight polyol.

The polyurethane resin of the present invention may be converted into a synthetic rubber by heating in the presence of one or more basic catalysts, and the present invention also includes such synthetic rubbers. The catalyst may be organic or inorganic and is preferably one which does not contain groups which react with isocyanate groups. Examples of such catalysts are: alkoxides, for example, sodium methoxide and sodium ethoxide; inorganic bases, for example, calcium oxide or hydroxide, barium oxide or hydroxide, and sodium hydroxide; and tertiary organic bases, for example, trimethylamine, N-alkylmorpholine(s) such as N-methylmorpholine, triethylene diamine, triethylamine, tripropylamine, tributylamine, triamylamine, tribenzylamine, and dimethylaniline, the amount of catalyst required usually being within the range 0.05 to 0.5% by weight based on the weight of the resin.

The process for the preparation of a polyurethane in accordance with the present invention can be carried out by the one-shot method under conditions in which the reaction mixture is "foamed" by any known or suitable means so as to produce a polyurethane plastic in the form of a polyurethane foam. The process for the preparation of a polyurethane in accordance with the present invention can also be carried out under conditions which yield a polyurethane prepolymer containing either free isocyanto (or isothiocyanato) radicals or free hydroxyl groups, the resulting prepolymer being suitable for use as such or for conversion into polyurethane plastics (including foamed plastics).

While the present invention is particularly applicable to the preparation of polyurethane foams by the one-shot method, the above-defined polyols are also eminently suitable for use in the production of prepolymers and also nonfoamed polyurethane plastics. The fact that such polyols are sufficiently reactive and yet have a controllable reactivity makes these polyols particularly suitable for the production of polyurethane foams of desirable cellular form by the one-shot method and it is possible by means of the present invention to prepare polyurethane foams having useful physical properties from polyols of various molecular weights e.g., from 500 to 6000 or more by the one-shot method. The ability to produce hard flexible foams of the required cellular form by the one-shot method from the higher molecular weight polyols e.g., of molecular weight from 4000 to 5000 or more e.g., up to 8000 is a particularly valuable feature of the present invention. As far as we are aware it has not hitherto been possible to produce such polyurethane foams from alkylene oxide condensation products having a molecular weight as high as 4000 by the one-shot method. This surprising technical advance in the art can now be achieved using the above-defined polyols. Providing the amount of ethylene oxide used in forming such as polyol does not exceed 10% by weight of the alkylene oxide (other than ethylene oxide) used in forming the condensation product from which the polyol is prepared, the polyol is sufficiently active that polyols of much higher molecular weight than was hitherto considered possible can be used to form open-cell polyurethane foams by the one-shot method. In fact, it has been found possible to prepare, by means of the present invention, polyurethane foams having density and hardness properties which are superior to those of polyurethane foams hitherto prepared from alkylene oxide condensation products (i.e., polyethers). Polyurethane foams having a predominantly open-cell structure have been prepared in accordance with the present invention having the following density and hardness properties:

| Density (lbs. per cu. ft.): | Indentation hardness (kilograms) |
| --- | --- |
| 2.4 and above | 40 to 50 |
| 2.3 | 45 to 48 |
| 2.2 | 40 to 45 |
| 2.1 | 38 to 43 |
| 2.0 | 35 to 40 |

The present invention accordingly also includes, as a novel product, a polyurethane foam which is characterized by a predominantly open-cell structure and a density of at least 2.0 pounds per cubic foot and an indentation hardness of at least 35 kilograms. A preferred polyurethane foam as just defined has a density within the range 2.0 to 2.5 pounds per cubic foot and an indentation hardness within the range 35 to 50 kilograms: such a polyurethane foam is eminently suitable for many applications in industry requiring a hard yet resilient material e.g., for use in upholstery.

In this specification "indentation hardness" means the hardness measured in accordance with the draft procedure described in British Standard Specification No. 3379/1961 using a sample 3 inches thick and a foam having a "predominantly open-cell structure" means a polyurethane foam which when cut in a plane parallel to the direction of rise shows more open cells per linear inch than closed cells. In the art the cell structure of a polyurethane foam is usually judged by eye from its appearance on cutting in the manner just indicated. Thus, another embodiment of the present invention is a process for the preparation of a polyurethane plastic which comprises reacting a polyurethane resin (prepolymer) prepared from a polyol in the manner described above and containing free isocyanato or isothiocyanato groups, with a compound containing a plurality of active hydrogen atoms as defined above or water. The present invention also includes the resulting polyurethane plastics, including those materials produced under conditions in which the carbon dioxide or carbon oxysulfide evolved in the reaction with the active hydrogen atoms forms bubbles giving rise to a foamed structure in the resulting polyurethane plastic.

The foamed polyurethane plastics are preferably produced in a single stage by direct reaction between the polyol, polyisocyanate and hydrogen-active compound (for example, water) and the present invention also includes the preparation of polyurethane plastics by such a single stage reaction (so-called "one-shot process").

Accordingly, therefore, a further embodiment of the present invention is a process for preparing a polyurethane plastic which comprises reacting an organic polyfunctional isocyanate or polyfunctional isothiocyanate of the general formula: $R(NCX)_{n+1}$ wherein R represents a polyvalent organic radical, X represents an oxygen or sulfur atom and $n$ is any integer in the presence of a compound containing a plurality of active hydrogen atoms, with a polyol formed by reacting (1) a condensation product of an alkylene oxide having at least three carbon atoms and an organic compound having a plurality of reactive hydrogen atoms in the molecule with (2) from 1 to 10 preferably from 3 to 8 percent by weight of the alkylene oxide of ethylene oxide, and advantageously the compound containing active hydrogen atoms is water and the reaction is effected in such a manner as to give rise to a foamed structure in the resulting polyurethane plastic.

The polyurethane resins (prepolymers) of the present invention are advantageously converted into polyurethane plastics by reaction with a difunctional compound, i.e., compounds having two groups each reactable with the isocyanato group and which may be reacted with the polyurethane resins of the present invention. Such compounds include water, glycols, diamines having primary or secondary amino groups, dicarboxylic acids, hydroxy amines, hydroxy acids and amino acids. Suitable compounds are, for example, ethylene glycol, 1:3-propane diol, 1:4-butane diol, ethylene diamine, trimethylene diamine, tetramethylene diamine, m-phenylene diamine, naphthylene diamines, toluene 2:4-diamine, aminobenzyl aniline, amino-diphenylamine, 2-amino ethyl alcohol, 2-amino 1-naphthol, m-aminophenyl, glycollic acid, alpha-hydroxypropionic acid, amino acetic acid and amino benzoic acid. The difunctional compound used preferably has a relatively low melting point, for example, below 150° C., for ease of mixing.

In general, if a foamed polyurethane plastic is desired by the two-stage prepolymer method, the polyurethane resin may be produced in the absence of a solvent and the resulting polyurethane resin then be reacted with water, hydrogen sulfide, a carboxylic acid, preferably a dicarboxylic acid, or an ester or polyester thereof containing free carboxylic groups, preferably in the presence of a surface active agent, e.g., a silicone. The reaction may be started at about room temperature, but being exothermic the temperature subsequently rises. Thus, a resinous foam may be produced by preparing the polyurethane resin in the absence of a solvent, mixing the resulting polyurethane resin with an emulsifier, a catalyst and water and then allowing the reaction to take place. Polyurethane plastics may be prepared in accordance with the present invention by reacting the polyurethane resin-containing reaction mixture (which may be a syrup) substantially as soon as it is prepared, at an elevated temperature, with water and/or an organic compound containing a plurality of active hydrogen atoms in an amount sufficient for all or substantially all the free isocyanato groups in the polyurethane resin to react; alternatively the syrup can be stored before use.

The catalysts which may be used in the above foaming reaction may be one or more of the tertiary organic bases, e.g., trimethyl-amine, N-alkylmorpholine(s) such as N-methylmorpholine, triethylene diamine, triethylamine, tripropylamine, tributylamine, triamylamine, tribenzylamine, and dimethylaniline, the amount of catalyst required usually being within the range of 0.05 to 0.5% by weight based on the weight of the resin.

Additives, particularly light stabilizers and/or antioxidants and also, if desired, fillers and/or pigments of various kinds can be incorporated in the mixture of the reactants used for preparing foamed polyurethane plastics in accordance with the present invention.

If desired, the polyurethane resin may be prepared in the presence of an organic solvent such as benzene, toluene, xylene, solvent naphtha, gasoline, carbon tetrachloride, ethyl acetate or amyl acetate. A film of the resulting solution may then be exposed to atmospheric moisture or reacted with an organic compound containing active hydrogen, to form a substantially bubble-free polyurethane plastic sheet.

Advantages of the invention are illustrated by the following examples. The reactants, and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

Example I

This example illustrates the preparation of novel polyurethane resins wherein an organic compound having a plurality of active hydrogen atoms in the molecule (glycerol) is condensed with an alkylene oxide (propylene oxide), with said reaction product then being "tipped" with ethylene oxide. This "tipped" polyol is then further reacted with toluene diisocyanate to produce the polyurethane resin.

A mixture of solid potassium hydroxide (334 gms.) dissolved in 7.4 lbs. of glycerol and 300 lbs. of propylene oxide were passed into an autoclave and the mixture was kept at a temperature of 110° C. and under a pressure of 45 to 50 p.s.i.g. for about 19 hours, then 23.5 lbs. of ethylene oxide was added and the mixture kept at 110° C. for ¾ hour. A triol of molecular weight 3,000 was obtained.

300 gms. of the triol prepared in the above-described manner were then mixed with 111 gms. of toluene diisocyanate, 0.25 gm. of triethylene diamine, 8.7 gms. of water and 3.0 gms. of Silicone Oil XL 520. This mixture was then stirred at a temperature of about 20° C. in a mold. The product was a rigid foam of satisfactory properties. When, however, a polyol formed by reacting with 11.5% or 14.2% weight of the propylene oxide of ethylene oxide was used, an unsatisfactory foam containing closed cells was produced by the method outlined above.

Example II

This example illustrates the preparation and properties of the novel polyurethane foams.

A mixture of solid potassium hydroxide (167 gms.) in 3.7 lbs. of glycerol and 290 lbs. of propylene oxide were passed into an autoclave and the mixture was kept at temperature of 110° C. under pressure of 45 to 50 p.s.i.g. for 37 hours. The product (which was too inactive for the production of satisfactory polyurethane foam) was then reacted with 8.5 lbs. of ethylene oxide at a temperature of 110° C. under pressure of 45 to 50 p.s.i.g. for 1 hour to give a polyol of molecular weight 5000 which was then subjected to the "one-shot" technique hereinbefore described. The foam was prepared from this polyol by mixing 100 parts of the polyol with 40.49 parts of toluene diisocyanate, 0.255 part of triethylene diamine, 1.0 part of Silicone Oil L520 (Union Carbide Corporation—a polysiloxane polyoxyalkylene block copolymer prepared in accordance with the disclosure in U.S. Patent No. 2,834,748), 2.9 parts of water, 0.05 part of dibutyl tin laureate and 0.5 part of stannous octoate, by passing the reactants continuously to a mixing head at ambient temperature and discharging the mixture into an open mold. The foam was cured by heating at about 40° C. for about 24 hours. This foam had the following properties:

Indentation hardness _____ (4-inch foam block—12-inch indentor).
20% compression _____ 40 kilos.
40% compression _____ 50 kilos.
Tensile strength _____ 16 p.s.i.
Elongation _____ 200%.

Example III

The process of Example I is essentially repeated except that toluene diisocyanate is replaced with an equivalent amount of ethylene diisothiocyanate. Related results are obtained.

Example IV

The process of Example I is substantially repeated except that glycerol is replaced with an equivalent amount of hexane-triol, 1,2,6-trimethylolpropane, pentaerythritol, and butenediol. Related results are obtained in all cases.

Example V

The process of Example I is essentially repeated except that an equivalent amount of styrene oxide is used in lieu of the propylene oxide. Similar results are obtained.

Example VI

The process of Example I is essentially repeated except that toluene diisocyanate is replaced with a equivalent quantity of ethylene diisocyanate, trimethylene diisocyanate, propylene-1,2-diisocyanate, ethylidene diisocyanate, and cyclohexylene-1,2-diisocyanate. Related results are obtained.

Example VII

A glycerol/propylene oxide condensation product of molecular weight 5000 was prepared in the manner described in Example II. This condensate was in itself insufficiently reactive, since it contained mainly secondary alcohol groups to be suitable for polyurethane manufacture and, in accordance with the present invention, it was reacted with three different amounts of ethylene oxide; namely, 3.1%, 4.6% and 6.1% (based on the weight of propylene oxide used in forming the condensate) to form three different polyols. Polyurethane foams of desired physical properties were obtained from each polyol, the various foams showing only small differences in physical properties. It was found, however, that the activity of the polyols increased with the increase in oxyethylene content thereof and that as a result the tolerance with respect to variations in the amounts of the various components of the formulation used for preparing the particular kind of foam required decreased. In other words the need to adhere to the amounts specified in the formulation became more critical as the oxyethylene content of the polyol increased. Consequently, from the point of view of permitting some tolerance in formulation on a manufacturing scale, about 3 to 4% of ethylene oxide (based on the weight of propylene oxide) will usually be sufficient in the case of glycerol/propylene oxide condensates of molecular weight about 5000, though larger amounts of ethylene oxide can be used, if desired, since it is still possible to obtain polyurethane foams of the required properties and cell structure even though formulation conditions may become more critical. In the case of condensates of higher molecular weight than 5000, e.g., a glycerol/propylene oxide condensation product having a molecular weight of about 8000, a somewhat large amount of ethylene oxide can be used before formulation conditions become critical to the same extent. In all cases, however, the investigations have shown that above the critical upper limit of 10% of ethylene oxide (based on the weight of propylene oxide) not only are the formulation conditions so critical as to make it very difficult to prepare foams of consistent properties by the one-shot method but the resulting foams are unacceptable because of their closed cell structure.

*Example VIII*

A glycerol/propylene oxide condensate prepared as described in Example II and having a molecular weight of 5000 was reacted with 3.1% of ethylene oxide (by weight of the propylene oxide used in forming the condensate) to form a polyol from which polyurethane foams were produced by the one-shot method in a continuous foam machine in which the output of reaction mixture from the mixing head was at the rate of 2,300 grams per minute and the residence time in the mixing head was 1.7 seconds. Three different formulations were used in three runs referred to as A, B and C in the data below:

FORMULATIONS

|  | A | B | C |
|---|---|---|---|
| Polyol | 100 | 100 | 100 |
| Toluene diisocyanate ('Suprasec' EN) | 40.5 | 36.3 | 42.7 |
| Triethylene diamine | 0.25 | 0.2 | 0.2 |
| Water | 2.9 | 2.9 | 3.5 |
| Dibutyltin dilaurate | 0.05 | 0.04 | 0.04 |
| Silicone fluid L520 | 1.0 | 1.0 | 1.0 |
| Stannous octoate | 0.5 | 0.4 | 0.4 |
| Stirrer speed (r.p.m.) | 3,000 | 5,000 | 5,500 |

'Suprasec' EN is an 80 : 20 mixture of 2,4 and 2,6 toluene diisocyanate.

POLYURETHANE FOAM PROPERTIES

|  | A | B | C |
|---|---|---|---|
| Cream time, sec | | 14 | 15 |
| Full rise time, sec | | 65 | 66 |
| Gell time, min | | 2.25 | 2.25 |
| Density, lb./cu. ft | 2.2-2.4 | 2.2-2.4 | 1.9-2.1 |
| Indentation hardness, (1) kg | 50 | 44 | 45 |
| Compression strength, p.s.i | 0.71 | 0.68 | 0.67 |
| At 40% deflection, g./cm | 49.9 | 47.8 | 47.0 |
| Hysteresis gap at 40% deflection, percent | 27.9 | 25.5 | 24.0 |
| Compression set, percent | 4.7 | 5.3 | 6.0 |
| Tensile strength: | | | |
| P.s.i | 15.7 | 22.4 | 20.8 |
| Kg./cm | 1.11 | 1.57 | 1.46 |
| Elongation, percent | 146 | 256 | 251 |
| Loss of height to flexing, (2) percent | 3.3 | 3.1 | 3.4 |
| Loss of compression strength due to flexing (2) | 8.4 | 14.5 | 10.5 |
| Breakdown in cell structure due to flexing (2) | NIL | NIL | NIL |

1 Using a circular foot 305 mm. in diameter and sample 3 in. thick.
2 Flexed 250,000 times to 50% original height at the rate of one flex per second, and allowing the samples 30 min. to recover before re-testing.

*Example IX*

This example illustrates the fact that increasing the amount of ethylene oxide used in forming the polyol increases its reactivity towards the organic polyisocyanate. A polyol similar to that described in Example VII except that it was prepared using 4.6% of ethylene oxide (by weight of propylene oxide) was used for the preparation of polyurethane foams using the following formulation:

| | Parts |
|---|---|
| Polyol | 100 |
| Toluene diisocyanate | 36.1 |
| Triethylene diamine | 0.15 |
| Water | 2.9 |
| Silicone Oil L520 | 1.0 |
| Dibutyl tin dilaurate | 0.027 |
| Stannous octoate | 0.27 |

The results obtained in the preparation of two polyurethanes under the same conditions, except for the speed of the stirrer in the mixing head, are as follows:

| | | |
|---|---|---|
| Stirrer speed (r.p.m.) | 2,250 | 2,500 |
| Cream time (secs.) | 12 | 14 |
| Full rise time (secs.) | 67 | 74 |
| Gell time (mins.) | 2.5 | 2.75 |
| Density (lb./cu. ft.) | 2.39 | 2.30 |
| Indentation hardness (kg.) | 40 | 37 |
| Compression strength (p.s.i.) | 0.65 | 0.59 |
| Compression set (percent) | 4.7 | 8.2 |
| Tensile strength (p.s.i.) | 23.6 | 25.7 |
| Elongation (percent) | 280 | 322 |
| Loss of height on flexing (percent) | 3.8 | 3.9 |
| Loss of compression strength on flexing (percent) | 2.4 | NIL |

*Example X*

This example illustrates the preparation of two polyurethane foams by the one-shot method described in Example VIII from two polyols (designated D and E respectively) prepared by reacting ethylene oxide with glycerol/propylene oxide condensates having molecular weights of 3000 and 4000 respectively. The amount of ethylene oxide was 3.1% by weight of propylene oxide in each case. The formulations employed and the results are as follows:

FORMULATIONS

|  | D | E |
|---|---|---|
| Polyol | 100 | 100 |
| Toluene diisocyanate | 42.5 | 43 |
| Triethylamine | 0.5 | |
| Triethylene diamine | | 0.35 |
| Dibutyl tin laurate | 0.04 | 0.04 |
| Water | 3.5 | 3.5 |

POLYURETHANE FOAM PROPERTIES

|  | D | E |
|---|---|---|
| Rise time (secs.) | 120 | 90 |
| Gell time (mins.) | 4 | 3 |
| Compression Strength (p.s.i.) | 0.72 | 0.5 |
| Compression set (percent) | 6.2 | 15.8 |
| Tensile strength (p.s.i.) | 76 | 117 |

*Example XI*

Although polyols formed from glycerol/propylene oxide condensation products, and also other polyhydric alcohol/propylene oxide condensation products, are particularly useful for the production of polyurethanes in accordance with the present invention since propylene oxide and the polyhydric alcohols such as glycerol, pentaerythritol and the hexane triols are all readily available starting materials for the production of suitable condensation products, it is also possible to use other organic compounds having a plurality (preferably at least three) of active hydrogen atoms in the molecule and this example illustrates the preparation of polyurethane foams by the one-shot method described in Example VIII from two polyols (designated F and G respectively) prepared by reacting ethylene oxide with triisopropanolamine/propylene oxide condensates having molecular weights of 5000 and 4000 respectively. The amount of ethylene oxide was 3% by weight of propylene oxide in each case.

The formulations employed and the results obtained are as follows:

FORMULATIONS

|  | F | G | G |
|---|---|---|---|
| Polyol | 100 | 100 | 100 |
| Toluene diisocyanate | 36.5 | 37.9 | 37.9 |
| Triethylene diamine | 0.3 | 0.25 | 0.35 |
| Water | 2.9 | 2.9 | 2.9 |
| Stannous octoate | 0.6 |  |  |
| Silicone Oil L520 | 1.0 | 0.7 | 1.0 |
| n-Ethyl morpholine |  | 0.03 |  |

POLYURETHANE FOAM PROPERTIES

|  | F | G | G |
|---|---|---|---|
| Gell time (min.) | 1.75 | 3 | 4 |
| Density (lb./cu. ft.) | 2.36 | 2.28 | 2.69 |
| Tensile strength (p.s.i.) | 15.1 | 14.7 | 13.5 |
| Elongation (percent) | 137 | 135 | 111 |
| Compression set (percent) | 5.0 | 4.3 | 4.6 |
| Compression strength (p.s.i.) | 0.55 | 0.50 | 0.53 |

It is possible that for some applications the use of polyols obtained by reacting ethylene oxide with trialkanolamine/propylene oxide condensates as starting materials for preparing polyurethane foams by the one-shot method will be advantageous from the point of view of reducing the amount of catalyst required for the foaming stage since, there are indications from the results of investigations that such polyols have themselves catalytic activity during foaming. It has also been found that the "feed" or "handle" of the polyurethane foams of this Example XI is different from that of the polyurethane foams prepared from polyols obtained by reacting up to 10% (be weight of propylene oxide) of ethylene oxide with glycerol/propylene oxide condensation products.

We claim as our invention:

1. A process for preparing polyurethane resins which comprises reacting under substantially anhydrous conditions an organic polyfunctional compound having the general formula $R(NCX)_{n+1}$, wherein R is a polyvalent organic radical, X is selected from the group consisting of oxygen and sulfur and $n$ is any integer, with a polyol formed by reaction (1) a condensation product of an alkylene oxide having at least three carbon atoms and an aliphatic polyhydric alcohol having at least three hydroxyl groups with (2) from 3% to 8% by weight of the alkylene oxide of ethylene oxide.

2. A process for preparing polyurethane resins which comprises reacting under substantialy anhydrous conditions toluene diisocyanate with a polyol having a molecular weight of from about 500 to 8000 and formed by reacting (1) a condensation product of propylene oxide and glycerol with (2) from 3% to 8% by weight of the propylene oxide of ethylene oxide.

3. A process for the preparation of a polyurethane foam which comprises reacting an organic aromatic diisocyanate with a polyol obtained by reacting simultaneously in a single step (1) a condensation product of 1,2-propylene oxide and an aliphatic polyhydric alcohol having at least three hydroxyl groups in the molecule, said condensation product having a molecular weight between about 2000 and 8000, with (2) from 3% to 8% by weight of the propylene oxide of ethylene oxide, the reaction between said polyol and said diisocyanate being carried out in the presence of water and under conditions which give rise to a foamed structure in the resulting polyurethane.

4. A process as in claim 3 wherein said condensation product is formed from glycerol.

References Cited

UNITED STATES PATENTS

| 2,927,905 | 3/1960 | Eckert | 260—2.5 |
| 2,948,757 | 8/1960 | Pruitt et al. | 260—615 |
| 2,955,091 | 10/1960 | Kane | 260—2.5 |
| 3,021,290 | 2/1962 | Gmitter et al. | 260—2.5 |
| 3,042,631 | 7/1962 | Strandskov | 260—2.5 |
| 3,097,176 | 7/1963 | Bender et al. | 260—2.5 |
| 3,112,281 | 11/1963 | Gromacki et al. | 260—2.5 |
| 3,149,083 | 9/1964 | Gmitter | 260—2.5 |

FOREIGN PATENTS

| 540,357 | 4/1957 | Canada. |

OTHER REFERENCES

Saunders, "Rubber Chem. & Tech.," vol. 33, No. 5, December 1960, pp. 1293–1322, pp. 1313–1317 relied upon.

Barringer, "Rigid Urethane Foams–11 Chemistry and Formulation," Du Pont Elastomers Chem. Dept. Bulletin HR–26; April 1958, pp. 27, 28 and 29.

DONALD E. CZAJA, *Primary Examiner.*

LEON J. BERCOVITZ, *Examiner.*